US007276832B2

(12) United States Patent
Miyashita et al.

(10) Patent No.: US 7,276,832 B2
(45) Date of Patent: Oct. 2, 2007

(54) PERMANENT MAGNET ROTARY MOTOR

(75) Inventors: Toshihito Miyashita, Nagano (JP);
Shintaro Koichi, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 134 days.

(21) Appl. No.: 11/204,518

(22) Filed: Aug. 16, 2005

(65) Prior Publication Data

US 2006/0038458 A1 Feb. 23, 2006

(30) Foreign Application Priority Data

Aug. 17, 2004 (JP) ............................. 2004-237031
Dec. 7, 2004 (JP) ............................. 2004-354612

(51) Int. Cl.
*H02K 1/17* (2006.01)
*H02K 1/14* (2006.01)
*H02K 1/18* (2006.01)
*H02K 1/27* (2006.01)
*H02K 21/12* (2006.01)

(52) U.S. Cl. ................. 310/216; 310/156.53; 310/156; 310/56; 310/254

(58) Field of Classification Search ................. 310/216, 310/218, 254, 156.53, 179, 180, 184, 185
See application file for complete search history.

(56) References Cited

U.S. PATENT DOCUMENTS 5,962,999 A * 10/1999 Nakamura et al. .......... 318/432

(Continued)

FOREIGN PATENT DOCUMENTS

EP 1 215 801 6/2002

(Continued)

OTHER PUBLICATIONS

WO 03/105321 A1, Electric Motor, Publication Date: Dec. 18, 2003.

*Primary Examiner*—Tran Nguyen
(74) *Attorney, Agent, or Firm*—Rankin, Hill, Porter & Clark LLP

(57) ABSTRACT

There is provided a permanent magnet rotary motor in which manufacture of a stator core is facilitated. The permanent magnet rotary motor includes P rotor magnetic pole sections and N slots. In this permanent magnet rotary motor, a least common multiple LCM (P, N) is set to be different from a least common multiple LCM (P/2, N), and an exciting winding is wound on each of N stator magnetic pole sections arranged in a peripheral direction so that a 120° current phase difference is obtained. N/2 divided cores 13A, 13C, 13E, 13G, 13I, and 13K of a first divided core group and N/2 divided cores 13B, 13D, 13F, 13H, 13J, and 13L of a second divided core group constitute a stator core 2. Cross-sectional shapes of the divided cores in the first and second divided core groups arranged on both sides of each of slots 9A to 9L taken in a direction perpendicular to an axis line passing through the center of a rotor 3 are shaped to be axisymmetrical with respect to a virtual line PL passing through the middle of an opening portion 9a or 9b of each slot and the axis line of the rotor 3. An open angle Wa of an opening portion 9a is set to be smaller than an open angle Wb of an opening portion 9b.

8 Claims, 5 Drawing Sheets

U.S. PATENT DOCUMENTS

| | | | |
|---|---|---|---|
| 6,049,153 A * | 4/2000 | Nishiyama et al. | 310/156.53 |
| 6,104,117 A * | 8/2000 | Nakamura et al. | 310/254 |
| 6,181,047 B1 * | 1/2001 | Nitta | 310/254 |
| 6,288,471 B1 * | 9/2001 | Kometani et al. | 310/254 |
| 6,424,073 B1 * | 7/2002 | Kometani et al. | 310/263 |
| 6,703,745 B2 * | 3/2004 | Chu | 310/156.45 |
| 6,885,127 B1 * | 4/2005 | Higashino et al. | 310/254 |
| 6,909,216 B2 * | 6/2005 | Kadoya et al. | 310/180 |
| 6,984,909 B2 * | 1/2006 | Kadoya et al. | 310/185 |
| 7,141,905 B2 * | 11/2006 | Vollmer | 310/216 |
| 2004/0130236 A1 | 7/2004 | Yonekura | |

FOREIGN PATENT DOCUMENTS

| | | |
|---|---|---|
| GB | 2 325 787 A | 12/1998 |
| JP | 7-255158 | 10/1995 |
| JP | 07-255158 | 10/1995 |
| JP | 11-178298 | 7/1999 |
| JP | 2000032690 * | 1/2000 |
| JP | 2001-186693 | 7/2001 |
| JP | 2001-309625 | 11/2001 |
| JP | 3505347 | 12/2003 |
| JP | 2004-15967 | 1/2004 |
| JP | 2004-222355 | 8/2004 |
| JP | 2004-304928 | 10/2004 |

* cited by examiner

PERMANENT MAGNET ROTARY MOTOR

BACKGROUND OF THE INVENTION

The present invention relates to a permanent magnet rotary motor in which a rotor including rotor magnetic pole sections formed of permanent magnets rotates.

Permanent magnet rotary motors have the rotor and a stator. Some rotors have a rotor core and the rotor magnetic pole sections formed of the permanent magnets. Some stators have a stator core including a plurality of stator magnetic pole sections, a plurality of slots having openings that open toward the rotor core, and exciting windings of at least two phases wound on these stator magnetic pole sections. It is known that, in the motor that uses the permanent magnets for the rotor magnetic pole sections, pulsating torque (cogging torque) and a thrust force are produced at the time of no-load operation. Such cogging torque hinders smooth rotation of the motor, thus causing vibration and speed variation of the motor. As an approach to reducing the cogging torque, there have been hitherto proposed formation of a slot with an oblique groove, hereinafter referred to as a skew, in the stator core or the rotor core, or use of a permanent magnet with the center of an inner circular arc thereof not aligned with the center of an outer circular arc thereof, hereinafter referred to as the permanent magnet of an eccentric type. However, formation of the skew may reduce the torque or reduce the productivity of the motor. Further, use of the permanent magnet of the eccentric type cannot increase the magnetic flux density of the motor, so that higher torque density cannot be achieved.

Then, in order to address these problems, Japanese Patent Application Laid-Open Publication No. 15967/2004 (Patent Document 1) discloses a permanent magnet rotary motor in which each of stator magnetic pole sections of a first type and each of stator magnetic pole sections of a second type are arranged alternately. Each of the stator magnetic pole sections of the first type has a pair of projecting portions that project in the peripheral directions of a rotor in a magnetic pole surface portion provided at the leading end of the stator magnetic pole section. On the other hand, each of the stator magnetic pole sections of the second type does not have the pair of projecting portions. In this permanent magnet rotary motor, at the tip of each stator magnetic pole section, a torque pattern having a waveform different from that of a torque pattern generated at the tip of other stator magnetic pole section adjacent thereto is generated. A variation in the torque generated in adjacent stator magnetic pole sections are thereby cancelled out with each other, thus preventing the cogging torque generated in the rotor.

In the permanent magnet rotary motor disclosed in Japanese Patent No. 3505347 (Patent Document 2), each of the two types of stator magnetic pole sections are alternately arranged in the peripheral direction of a rotor. The dimensions of the magnetic pole surfaces of the two types of stator magnetic pole sections in the peripheral direction are different.

Further, in a permanent magnet rotary motor disclosed in Japanese Patent Application Laid-Open Publication No. 178298/1999 (Patent Document 3), each of the two types of stator magnetic pole sections is alternately arranged in the peripheral direction of a rotor. The curvatures of the magnetic pole surfaces of the two types of the stator magnetic pole sections are different.

In a permanent magnet rotary motor disclosed in Japanese Patent Application Laid-Open Publication No. 309625/2001 (Patent Document 4), widths of openings of a plurality of slots formed in a stator core in the peripheral direction of a rotor are made different alternately.

In the permanent magnet rotary motor constituting the stator core as described above, however, two types of divided cores having different shapes of the projecting portions provided at the leading ends of the stator magnetic pole sections must be prepared. Thus, in order to manufacture the stator core, the number of component types must be increased, and manufacture of the assembly of the stator core thus may become complicated.

In the permanent magnet rotary motor in Patent Document 4, in particular, has eight poles and 24 slots. Accordingly, a least common multiple LCM (P, N) of the number of rotor magnetic pole sections P(8) and the number of slots N (24) and a least multiple LCM (P/2, N) of a half of the number of the rotor magnetic pole sections ½ P(8) and the number of the slots N(24) are an equal value of 24. Further, phase of a current flowing through two of adjacent windings arranged in the peripheral direction of the rotor are shifted as indicated in the sequence of +U, +U, +V, +V, +W, +W, and the like so that currents that flow through the adjacent windings have a phase difference of an electrical angle of 120° respectively. When the open angles of the slots are set as described above in such the permanent magnet rotary motor, magnetic leakage flux is suppressed. An induced voltage is therefore improved. However, the torque is reduced, so that torque ripple is increased.

SUMMARY OF THE INVENTION

An object of the present invention is therefore to provide a permanent magnet rotary motor that can reduce cogging torque and torque ripple.

Another object of the present invention is to provide a permanent magnet rotary motor in which manufacture of a stator core is facilitated.

A permanent magnet rotary motor improvement of which the present invention aims at includes a rotor and a stator.

The rotor includes a rotor core and P rotor magnetic pole sections (P: an even natural number of 4 or more) formed of permanent magnets mounted to the rotor core. The P rotor magnetic pole sections are arranged at equal angle intervals of 360°/P in a peripheral direction of the rotor core. The stator includes a stator core and N winding sections (N: a multiple of 6). The stator core includes N stator magnetic pole sections having magnetic pole surfaces facing the rotor core and having equal lengths in the peripheral direction, and N slots each including an opening portion that opens toward the rotor core. Each of the N magnetic pole sections and each of the N slots of the stator core are alternately arranged at equal angle intervals of 360°/2N in the peripheral direction. Exciting winding is concentratedly wound on the N stator magnetic pole sections, respectively, thereby constituting the winding sections. In the permanent magnet rotary motor of the present invention, a least common multiple LCM (P, N) of the P and the N is set to be different from a least common multiple LCM (P/2, N) of the N and ½ of the P. Further, currents flowing through three of the winding sections adjacent to one another in the peripheral direction have a phrase difference of an electrical angle of 120° from one another. More specifically, the phases of the current that flows through the winding sections arranged in the peripheral direction are indicated by the sequence of +U, +V, +W, +U, +V, +W, and the like.

In the present invention, the N slots are grouped into N/2 slots constituting a first slot group and N/2 slots constituting a second slot group. The open angle of the opening portion of each slot in the first slot group in the peripheral direction is defined as a first angle and the open angle of the opening portion of each slot in the second slot group is defined as a second angle, which is smaller than the first angle. Incidentally, the open angle of the opening portion is herein defined to be the angle between two virtual lines that connect the center of the rotor to both ends of the opening portion of a slot in the peripheral direction of the rotor. Then, N/2 divided cores belonging to a first divided core group and N/2 divided cores belonging to a second divided core group constitute the stator core. Specifically, each of the divided cores belonging to the first divided core group and each of the divided cores belonging to the second divided core group are alternately arranged in the peripheral direction, thereby constituting the stator core. Then, cross-sectional shapes of the divided cores belonging to the first divided core group and the second divided core group arranged on both sides of each slot taken in a direction perpendicular to an axis line passing through the center of the rotor are shaped to be axisymmetrical with respect to a virtual line passing through the middle of the opening portion of each slot and the axis line of the rotor. With this arrangement, the N/2 slots in the first slot group are alternatively arranged with the N/2 slots in the second slot group in the stator core in the peripheral direction.

In the permanent magnet rotary motor of the present invention, the slots belonging to the first slot group and the slots belonging to the second group are alternatively arranged in the peripheral direction. Thus, the open angles of the opening portions of two adjacent slots are different, and the open angle of the opening portion of every other slot are the same. For this reason, in the positions of the slots of which the opening portions have a larger open angle, torque of the rotor is increased. In the positions of the slots of which the opening portions have a smaller open angle, cogging torque of the rotor is reduced. Such an increase in the torque works synergistically with such a reduction in the cogging torque. Consequently, the cogging torque and torque ripple can be uniformly reduced over the entire stator, while maintaining the torque.

In the permanent magnet rotary motor of the present invention, in particular, the least common multiple LCM (P, N) of the P and the N is set to be different from the least common multiple LCM (P/2, N) of ½ of the P and the N. Further, currents flowing through three of the winding sections adjacent to one another in the peripheral direction have a phase difference of an electrical angle of 120° from one another. Thus, the torque can be increased, and the torque ripple can be reduced. The reason for this is considered to be that because the phases of the current that flows through the winding sections arranged in the peripheral direction are indicated by the sequence of +U, +V, +W, +U, +V, +W, and the like, magnetic fluxes are concentrated on the centers of the stator magnetic pole sections.

The contour of each divided core belonging to the first divided core group as seen from one of axis line directions of the rotor becomes the same as the contour of each divided core belonging to the second divided core group as seen from the other of the axis line directions of the rotor. More specifically, each divided core belonging to the second divided core group is obtained by turning over the divided core used for the first divided core group in the peripheral direction. As a result, according to the present invention, the divided cores of only one type of the shape are sufficient for the stator core, and the cogging torque can be reduced without increasing kinds of components. Moreover, manufacture of the stator core can also be facilitated.

Herein, the rotor may be the one in which the permanent magnets are arranged on the surface of the rotor core. Alternatively, the rotor may be the one in which the permanent magnets are embedded within the rotor core. The rotor magnetic pole sections are herein defined to be the magnetic pole sections formed in certain regions due to the presence of the permanent magnets. Two or more spaced permanent magnets of the same polarity may be combined to constitute one magnetic pole section. When one rotor magnetic pole section is formed by combination of two permanent magnets that are spaced apart to each other at a predetermined interval, for example, the number of the rotor magnetic pole sections P is a half of the number of the permanent magnets. Between two embedded adjacent permanent magnets, a magnetic pole section, of which the polarity is different from that of the two adjacent permanent magnets, can be formed without embedding a permanent magnet therebetween. The magnetic pole section thus formed without embedding the permanent magnet also composes a rotor magnet magnetic pole section. In this case, though the number of the permanent magnets actually embedded is P/2, the number of the resulting rotor magnetic pole sections is P (double of P/2).

Preferably, an angle difference between the first angle and the second angle is set to be in the range of $[(360°/LCM(P, N)] \times (4/3) - 1°$ to $[360°/LCM(P, N)] \times (4/3) + 1°$. When the angle difference is set in this range, the cogging torque can be greatly reduced. If the angle difference is below this range, or if the angle difference is beyond this range, the cogging torque tends to be increased.

Each of the divided cores, specifically, includes an arcuate yoke constituent section, a winding-wound section, and a magnetic surface constituent section. The winding-wound section extends toward the rotor from substantially the middle of the yoke constituent section and with the exciting winding wound thereon. The magnetic surface constituent section is integrally formed at the leading end of the winding-wound section. The magnetic surface constituent section includes one projecting portion projecting along the yoke constituent section. In this case, the end of the magnetic surface constituent section of each of the divided cores in the first divided core group without the projecting portion faces the end of the magnetic surface constituent section of each of the divided cores in the second divided core group without the projecting portion. Then, the opening portion of each of the slots in the first slot group having the first angle is formed between the ends of the magnetic surface constituent sections of the divided cores of the first and second divided core groups. Further, the projecting portion of each of the divided cores in the first divided core group faces the projecting portion of each of the divided cores in the second divided core group, and the opening portion of each of the slots in the second slot group having the second angle is formed between the projecting portions of the divided cores of the first and second divided core groups.

Alternatively, the magnetic surface constituent section may include a first projecting portion and a second projecting portion having different projecting dimensions. The first projecting portion and the second projecting portion extend along the yoke constituent section and project toward both peripheral directions of the rotor core, respectively. In this case, the first projecting portion of each of the divided cores in the first divided core group faces the first projecting portion of each of the divided cores in the second divided core group, and the opening portion of each of the slots in the first slot group having the first angle is formed between the first projecting portions of the divided cores of the first and second divided core groups. Further, the second projecting portion of each of the divided cores in the first divided core group faces the second projecting portion of each of the divided cores in the second divided core group, and the opening portion of each of the slots in the second slot group having the second angle is formed between the second projecting portions of the divided cores of the first and second divided core groups. In such divided cores, by appropriately designing the shapes of the two projecting portions that respectively project in the peripheral directions of the rotor, desired reduction of the cogging torque and a desired increase in the torque can be obtained. In both cases, the shape of the one projecting portion and the shapes of the first and second projecting portions may be arbitrarily designed.

When the rotor magnetic pole sections are formed by embedding the permanent magnets within the rotor core, it is preferable that the surface portions of the rotor core with the permanent magnets embedded therein are curved so that the surfaces portions expand toward the stator. With this arrangement, because of the structure of the rotor core, the cogging torque can be further reduced.

When the P rotor magnetic portions are embedded inside the rotor core and the outer peripheral portions of the rotor core accommodating the rotor magnetic pole sections are curved in such a manner to expand in a radially outward direction of the rotor, and when the P is set to 16 and the N is set to 12, a permanent magnet rotary motor suitable for practical use can be obtained.

When the P rotor magnetic pole sections are mounted to the outer peripheral surface of the rotor core, and when the P is set to 8 and the N is set to 12, a permanent magnet rotary motor suitable for practical use can be obtained.

According to the present invention, by alternating the open angles of the opening portions of the slots in the peripheral direction of the rotor, an increase in the torque works synergistically with a reduction in the cogging torque. Consequently, the cogging torque can be uniformly reduced over the entire stator, while maintaining the torque.

According to the present invention, the contour of each divided core belonging to the first divided core group as seen from one of axis line directions of the rotor is the same as the contour of each divided core belonging to the second divided core group as seen from the other of the axis line directions of the rotor. For this reason, by turning over the divided core used for the first divided core group in the peripheral direction, each divided core belonging to the second divided core group can be obtained. As a result, according to the present invention, the divided core of only one type of the shape is sufficient for the stator core. As a result, according to the present invention, the cogging torque can be reduced without increasing kinds of components. Moreover, manufacture of the stator core can also be facilitated.

In the permanent magnet rotary motor of the present invention, in particular, the least common multiple LCM (P, N) of the P and the N is set to be different from the least common multiple LCM (P/2, N) of ½ of the P and the N. Further, currents flowing through three of the winding sections adjacent to one another in the peripheral direction have an electrical angle of 120° from one another. Thus, the torque can be increased, and the torque ripple can be reduced. The reason for this is considered to be that because the phases of the current that flows through the winding sections arranged in the peripheral direction are indicated by the sequence of +U, +V, +W, +U, +V, +W, and the like, magnetic fluxes are concentrated on the centers of the stator magnetic pole sections.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF PREFFERED EMBODIMENTS

Figure 1:
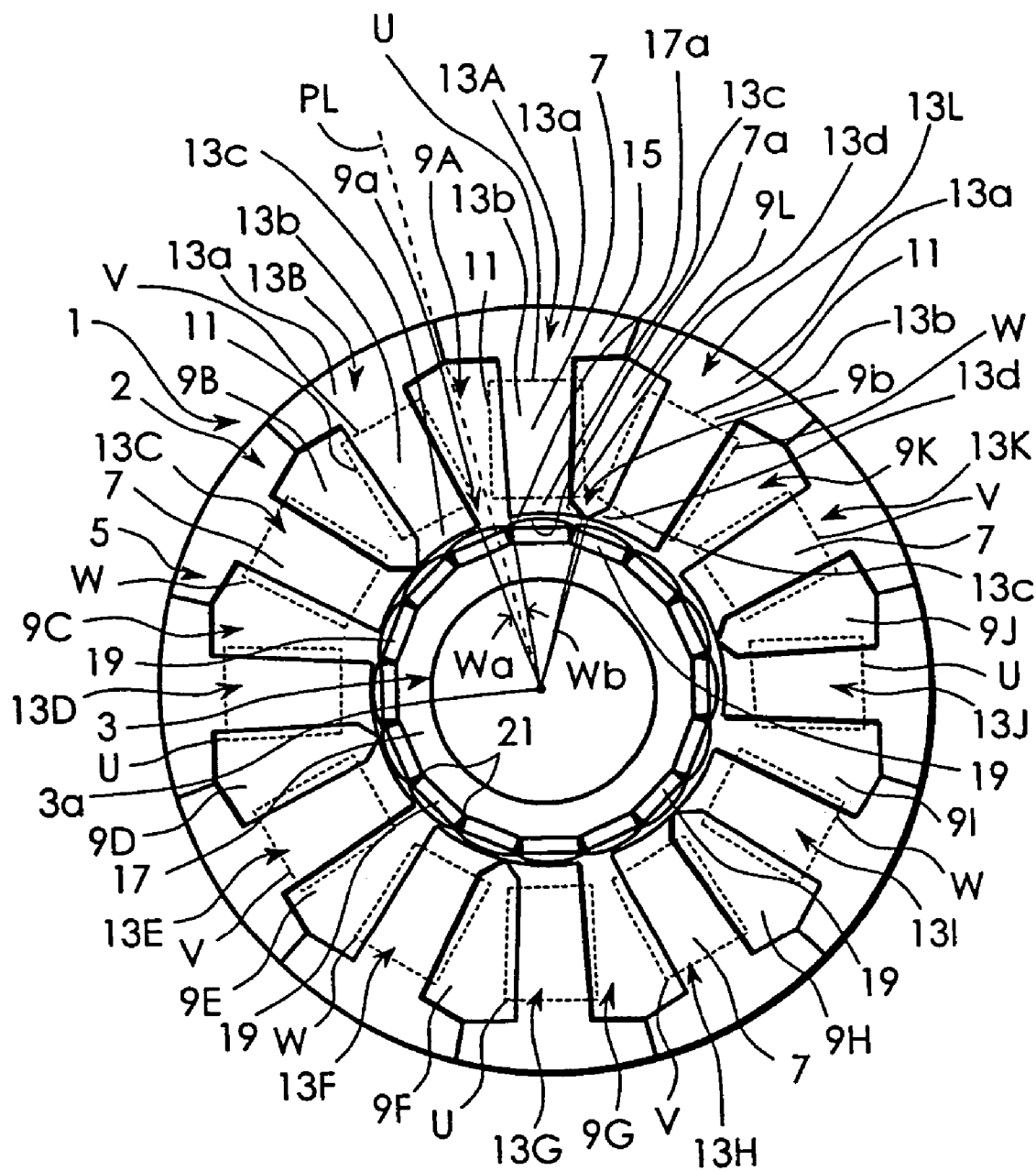
FIG. 1 is a schematic diagram showing a stator and a rotor of a permanent magnet rotary motor used for explaining a first embodiment of the present invention.

Embodiments of the present invention will be described below in detail with reference to the appended drawings. FIG. 1 is a schematic diagram showing a stator 1 and a rotor 3 of a permanent magnetic rotary motor used for explaining a first embodiment of the present invention. As shown in FIG. 1, the stator 1 has a stator core 2 and winding sections 11. The stator core 2 has a cylindrical yoke 5 and 12 stator magnetic pole sections 7 that extend from the inner periphery of the yoke 5 toward the center of the stator core. Each of the 12 stator magnetic pole sections 7 has a magnetic surface 7a at a leading end thereof.

The stator core 2 is constituted by 12 divided cores 13A to 13L arranged in combination in a peripheral direction of the rotor 3. The arrangement is such that the 12 divided cores 13A to 13L are alternately inverted or turned over in the peripheral direction. The divided cores 13A to 13L are configured by laminating a plurality of steel plates 15 in an axis line direction of the rotor 3. Referring to the divided core 13A, the divided core 13A includes an arcuate yoke constituent section 13a, a winding-wound section 13b that extends from substantially the middle of the yoke constituent section 13a toward the rotor 3 and with an exciting winding wound thereon, and a magnetic surface constituent section 13c integrally provided at the leading end of the winding-wound section 13b. Like the divided core 13A, each of other divided cores has the arcuate yoke constituent section 13a, winding-wound section 13b, and magnetic surface constituent section 13c. The exciting winding is concentratedly wound on each winding-wound section 13b, thereby constituting a winding section 11. Currents that flow through three of the winding sections 11 arranged adjacent to one another in the peripheral direction have a phase difference of an electric angle of 120° from one another. More specifically, the phases of a current that flow through the 12 winding sections 11 arranged in the peripheral direction are indicated by the sequence of +U, +V, +W, +U, +V, +W, and the like. Incidentally, for better understanding, each winding section 11 in FIG. 1 is indicated by a broken line. The magnetic surface constituent section 13c includes one projecting portion 13d that extends along the yoke constituent section 13a. The 12 divided cores 13A to 13L includes six (N/2) divided cores (13A, 13C, 13E, 13G, 13I, and 13K) that belong to a first divided core group and six (N/2) divided cores (13B, 13D, 13F, 13H, 13J, and 13L) that belong to a second divided core group. The projecting portions 13d in the first divided core group project in one of the peripheral directions of the rotor 3, while the projecting portions 13d in the second divided core group project in the other of the peripheral directions of the rotor 3. For this reason, the stator core 2 is configured by alternately arranging the six (N/2) divided cores (13A, 13C, 13E, 13G, 13I, and 13K) of the first divided group with the six (N/2) divided cores (13B, 13D, 13F, 13H, 13J, and 13L) of the second divided group, respectively, in the peripheral direction.

In this embodiment, cross-sectional shapes of a divided core (such as the divided core 13A) in the first divided core group and a divided core (such as the divided core 13B) in the second divided core group, arranged on each of the both sides of a slot (such as a slot 9A), taken in a direction perpendicular to an axis line passing through a center 3a of the rotor 3 are shaped to be axisymmetrical with respect to a virtual line PL. The virtual line PL passes through the middle of the opening portion of the slot 9A and the axis line of the rotor 3. Then, the end of the magnetic surface constituent section 13c of each of the divided core 13A, 13C, 13E, 13G, 13I, and 13K in the first divided core group without the projecting portion 13d faces the end of the magnetic surface constituent section 13c of each of the divided core 13B, 13D, 13F, 13H, 13J, and 13L in the second divided core group without the projecting portion 13d, respectively. The opening portions of the slot 9A, and slots 9C, 9E, 9G, 9I, and 9K belonging to a first slot group and having a first angle Wa are respectively formed between the ends of the magnetic surface constituent sections 13c of the divided cores 13A and 13B, divided cores 13C and 13D, divided cores 13E and 13F, divided cores 13G and 13H, divided cores 131 and 13J, and divided cores 13K and 13L. Further, the projecting portions 13d of the divided cores 13A, 13C, 13E, 13G, 13I, and 13K in the first divided core group faces the projecting portions 13d of the divided cores 13B, 13D, 13F, 13H, 13J, and 13L in the second divided core group, respectively. Then, the opening portions of slots 9B, 9D, 9F, 9H, 9J, or 9L belonging to a second slot group and having a second angle Wb are respectively formed between the projecting portions 13d of the divided cores 13B and 13C, divided cores 13D and 13E, divided cores 13F and 13G, divided cores 13H and 13I, divided cores 13J and 13K, and divided cores 13A and 13L.

When defining the first angle Wa and the second angle Wb, two line segments connecting each of the both ends of the opening portion of a slot such as 9A and 9B in the peripheral direction of the rotor 3 and the center 3a of the rotor 3 are first assumed. Then, the angle formed between the two line segments assumed for each of the both ends of the opening portion is defined to be the open angle Wa or Wb of the opening portion. As described before, in the opening portion of each slot belonging to the second slot group and having the second angle Wb, the projecting portions 13d of two adjacent divided cores face each other. In each slot belonging to the first slot group and having the first angle Wa, the projecting portions 13d of two adjacent divided cores do not face each other. The second angle Wb thus becomes smaller than the first angle Wa. With this arrangement, the 12 (N) slots are grouped into the six (N/2) slots (9A, 9C, 9E, 9G, 9I, and 9K) constituting the first slot group and having the first angle Wa of the opening portion thereof measured in the peripheral direction and the six (N/2) slots (9B, 9D, 9F, 9H, 9J, and 9L) constituting the second slot group and having the second angle Wb smaller than the first angle Wa.

In this embodiment, the 12 divided cores 13A to 13L were combined into an annular shape, thereby forming an annular stator core constituent. Then, by shrink fitting an annular frame to the outer periphery of the annular constituent formed of the divided cores 13, the stator core 2 was formed. This technique is described in detail in Japanese Patent Application Laid-Open Publication No. 308141/1997. Incidentally, adhesive may be of course applied to both end surfaces of the yoke constituent 13a, for performing shrink fitting.

The rotor 3 includes a substantially cylindrical rotor core 17 and sheet-like permanent magnets 19 constituting P (being 16, herein) rotor magnetic pole sections embedded in a vicinity of the surface portion of the rotor core 17 at equal intervals in the peripheral direction of the rotor 3. In this embodiment, one permanent magnet constitutes one rotor magnetic pole section. A pair of flux barriers each made of a cavity is formed on each of the both ends of each permanent magnet 19 in the peripheral direction. These flux barriers are formed of a nonmagnetic material such as air, thereby promoting flow of magnetic fluxes to the stator 1. The P permanent magnets 19 are magnetized so that each of the N poles is alternately arranged with each of S poles on the side of the surface of the rotor core 17. The rotor core 17 is configured by lamination of a plurality of steel plates, and the surface of the rotor core 17 in which the permanent magnets are embedded is constituted by curved surfaces 17a that project toward the stator core 1.

As described above, the permanent magnet rotary motor in this embodiment has a structure with 16 poles and 12 slots. With this arrangement, a least common multiple LCM (P, N) of the number of the rotor magnetic pole sections P (16) and the number of the slots N (12) and a least common multiple LCM (P/2, N) of a half the number of the rotor magnetic pole sections ½P (8) and the number of the slots N (12) become 48 and 24, respectively, which are values different to each other. In this embodiment, the first and second angles Wa and Wb of the opening portions are set so that an angle difference between the first and second angles Wa−Wb becomes the value calculated by an equation Wa−Wb=360°/LCM(P, N)×4/3±1° or the angle difference Wa−Wb ranges from 9° to 11°.

In the permanent magnet rotary motor in this embodiment, each divided core 13 includes the projecting portion 13d that projects toward the peripheral direction of the rotor 3 from one end edge of the magnetic surface constituent section 13c in the peripheral direction of the rotor 3. By alternately turn over divided cores 13 in the peripheral direction, and then combining the turned divided cores with the divided cores 13 in the peripheral direction of the rotor 3, the stator core 2 is configured. For this reason, in the stator 2 having the 12 slots 9A to 9L, each of the slots 9A, 9C, 9E, 9G, 9I, and 9K having the first angle Wa, belonging to the first slot group is arranged alternately with each of the slots 9B, 9D, 9F, 9H, 9J, and 9L having the second angle Wb smaller than the first angle Wa, respectively. Accordingly, in the positions of the slots 9A, 9C, 9E, 9G, 9I, and 9K having the first angle Wa, which is the larger open angle of the opening portions, the torque of the rotor 3 increases. On the other hand, in the positions of the slots 9B, 9D, 9F, 9H, 9J, and 9L having the second angle Wb, which is the smaller open angle of the opening portions, the cogging torque of the rotor 3 is reduced. Such an increase in the torque works synergistically with such a reduction in the cogging torque. Consequently, the cogging torque and torque ripple can be uniformly reduced over the entire stator, while maintaining the torque. As an alternative configuration of the stator core 2, the stator core 2 can also be configured by using the divided cores of the shape of one type formed by laminating the steel plates 15 of the shape of one type.

Figure 2:
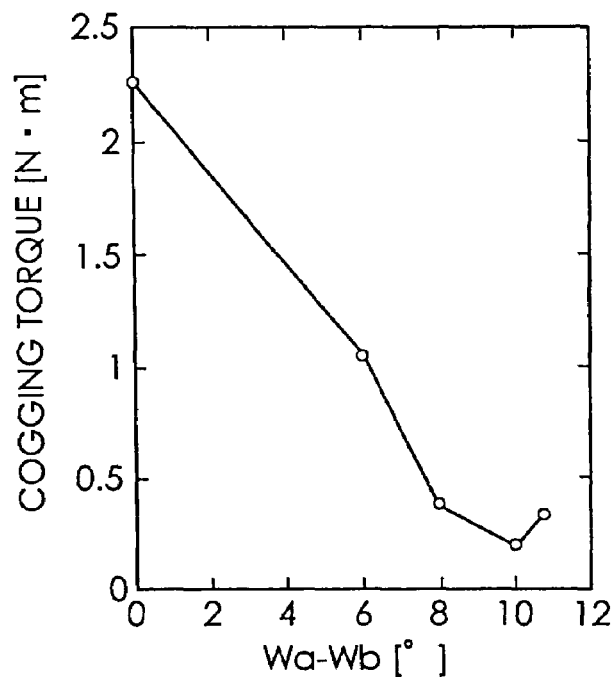
FIG. 2 is a graph showing a result obtained by examining the relationship between the value of an angle difference Wa−Wb and the value of cogging torque in the permanent magnet rotary motor shown in FIG. 1.

FIG. 2 is a graph showing a result obtained by changing the value of the angle difference Wa–Wb in the permanent magnet rotary motor in this embodiment to examine the relationship between the value of the angle difference Wa–Wb and the value of the cogging torque. It can be seen from FIG. 2 that when the value of the angle difference Wa–Wb is set in the range of 9° to 11°, or a value calculated by Wa–Wb=360°/LCM (P, N)×4/3±1°, the cogging torque can be minimized to 0.3 N·m or less.

Figure 3:
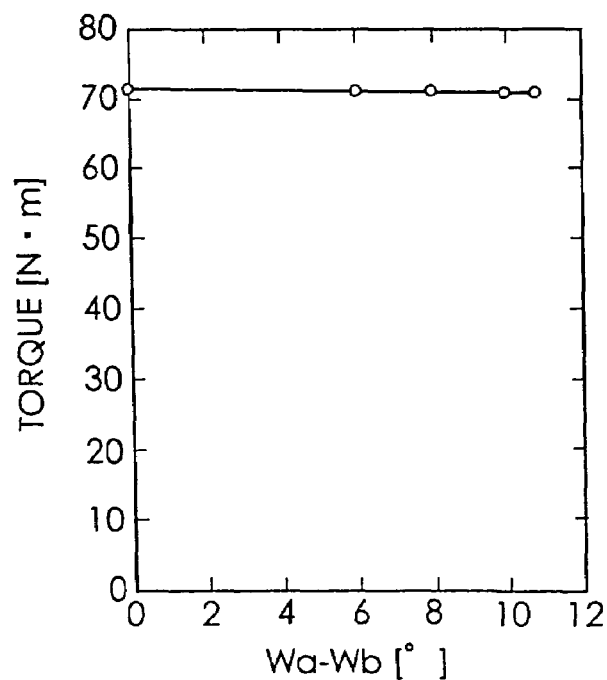
FIG. 3 is a graph showing a result obtained by examining the relationship between the value of the angle difference Wa−Wb and the value of torque in the permanent magnet rotary motor shown in FIG. 1.

FIG. 3 is a graph showing a result obtained by changing the value of the angle difference Wa–Wb in the permanent magnet rotary motor in this embodiment to examine the relationship between the value of the angle difference Wa–Wb and the value of the torque. It can be seen from FIG. 3 that even if the value of the angle difference Wa–Wb is changed diversely, the torque is scarcely changed.

Figure 4:
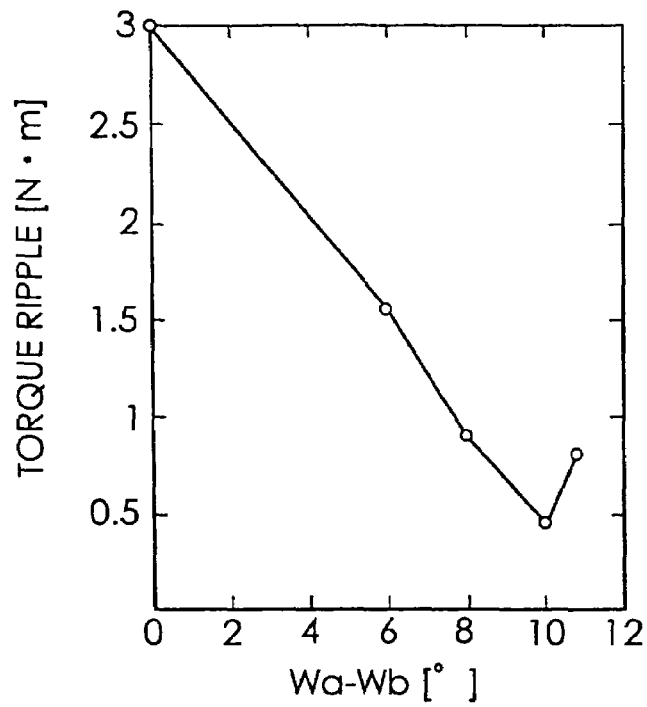
FIG. 4 is a graph showing a result obtained by examining the relationship between the value of the angle difference Wa−Wb and the value of torque ripple in the permanent magnet rotary motor shown in FIG. 1.

FIG. 4 is a graph showing a result obtained by changing the value of the angle difference Wa–Wb in the permanent magnet rotary motor in this embodiment to examine the relationship between the value of the angle difference Wa–Wb and the value of the torque ripple. It can be seen in FIG. 4 that when the value of the angle difference Wa–Wb is set in the range of 9° to 11°, the torque ripple can be minimized.

Figure 5:
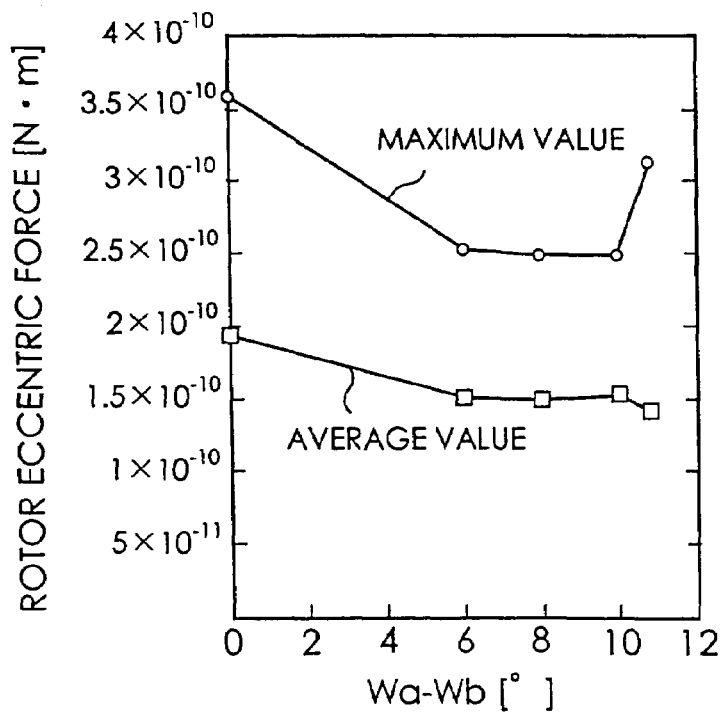
FIG. 5 is a graph showing results obtained by examining the relationship between the value of the angle difference Wa−Wb and the maximum value of a rotor eccentric force and the relationship between the value of the angle difference Wa−Wb and the average value of the rotor eccentric force in the permanent magnet rotary motor shown in FIG. 1.

FIG. 5 is a graph showing a result obtained by changing the value of the angle difference Wa–Wb in the permanent magnet rotary motor in this embodiment to examine the relationship between the value of the angle difference Wa–Wb and the maximum value of a rotor eccentric force and the relationship between the value of the angle difference Wa–Wb and the average value of the rotor eccentric force. It can be seen in FIG. 5 that even if the value of the angle difference Wa–Wb is changed diversely, the maximum value and the average value of the rotor eccentric force are not so greatly changed.

Figure 6:
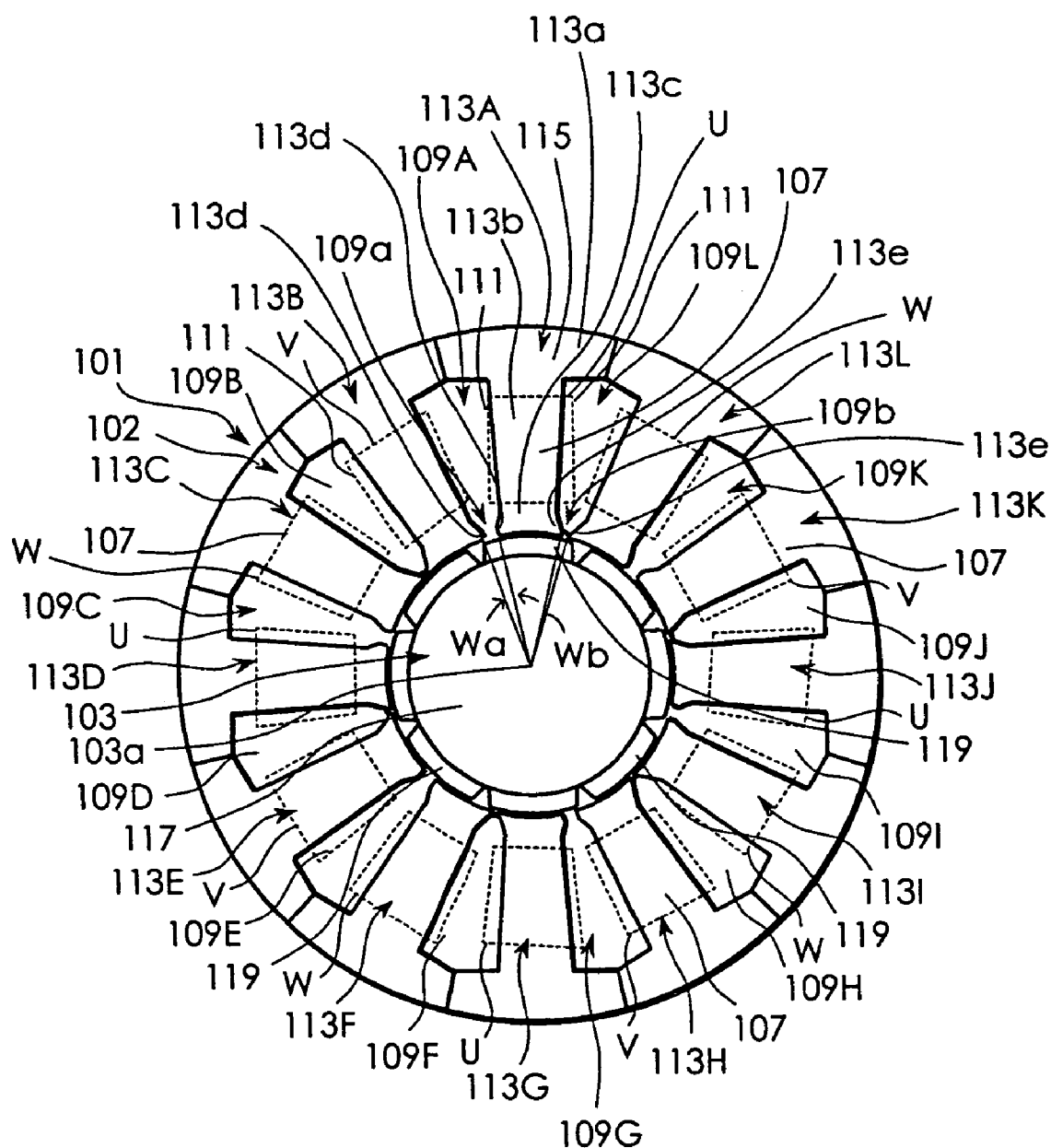
FIG. 6 is a schematic diagram showing a stator and a rotor of a permanent magnet rotary motor used for explaining a second embodiment of the present invention.

FIG. 6 is a schematic view of a stator 101 and a rotor 103 of a permanent magnet rotary motor used for describing a second embodiment of the present invention. As shown in FIG. 6, a stator core 102 of the stator 101 of the permanent magnet rotary motor in the second embodiment has 12 stator magnetic pole sections 107 and N (being 12, herein) slots 109A to 109L, like the permanent magnet rotary motor in the first embodiment shown in FIG. 1. 12 divided cores 113A to 113L constituting the stator core 102 are configured by laminating a plurality of steel plates 115 in the axis line direction of the rotor 103. Each of the divided cores 113A to 113L includes an arcuate yoke constituent section 113a, a winding-wound section 113b that extends toward the rotor 103 from substantially the middle of the yoke constituent section 113a and with the exciting winding wound thereon, and a magnetic surface constituent section 113c provided at the leading end of the winding section 113b. The exciting winding is concentratedly wound on each winding section 113b, thereby constituting a winding section 111. Currents that flow through three winding sections 111 arranged adjacent to one another in a peripheral direction of the rotor 103 have a phase difference of an electrical angle of 120° from one another. More specifically, the phases of the current that flows through 12 winding sections 111 arranged in the peripheral direction are indicated by the sequence of +U, +V, +W, +U, +V, +W, and the like. The magnetic pole constituent section 113c includes first and second projecting portions 113d and 113e that project from each of the both edges of the magnetic pole constituent section 113c in the peripheral direction of the rotor 103 toward both peripheral directions of the rotor 103. The dimensions of the first projecting portion 113d that project in the peripheral direction of the rotor 103 are smaller than those of the second projecting portion 113e. With this arrangement, as opening portions of the 12 slots 109A to 109L in the stator core 102, first opening portions 109a each formed by the adjacent two of the first projecting portions 113d facing to each other and second opening portions 109b formed by the adjacent two of the second projecting portions 113e facing to each other are alternately formed. Then, the dimensions of the second opening portions 109b in the peripheral direction of the rotor 103 become smaller than the dimensions of the first opening portion 109a in the peripheral direction of the rotor 103. In other words, in this embodiment, the first projecting portions 113d of the divided cores belonging to the first divided core group (including the divided cores 113A, 113C, 113E, 113G, 113I, and 113K) face the first projecting portions 113d of the divided cores belonging to the second divided core group (including the divided cores 113B, 113D, 113F, 113H, 113J, and 113L). Then, the first opening portions 109a of the slots 109A, 109C, 109E, 109G, 109I, and 109K in the first slot group and having the first angle Wa are respectively formed between the first projecting portions 113d of the divided core 113A and 113B, divided cores 113C and 113D, divided cores 113E and 113F, divided cores 113G and 113H, divided cores 113I and 113J, and divided cores of 113K and 113L of the first and second divided core groups. Further, the second projecting portions 113e of the divided cores belonging to the first divided core group (including the divided cores 113A, 113C, 113E, 113G, 113I, and 113K) face the second projecting portions 113e of the divided cores belonging to the second divided core group (including the divided cores 113B, 113D, 113F, 113H, 113J, and 113L). Then, the second opening portions 109b of the slots 109B, 109D, 109F, 109H, 109J, and 109L belonging to the second slot group and having the second angle Wb are respectively formed between the first projecting portions 113e of the divided cores 113B and 113C, divided cores 113D and 113E, divided cores 113F and 113G, divided cores 113H and 113I, divided cores 113J and 113K, and divided cores 113L and 113A of the first and second divided core groups. As described before, the dimensions of the first projecting portions 113d that project in the peripheral direction of the rotor 103 are smaller than the dimensions of the second projecting portions 113e that project in the peripheral direction of the rotor 103. The second angle Wb thus becomes smaller than the first angle Wa.

The rotor 103 includes a substantially cylindrical rotor core 117 and P sheet-like permanent magnets 110 constituting P (being eight, herein) rotor magnetic pole sections arranged on the surface of the rotor core 117 at equal intervals in the peripheral direction. In this embodiment, one permanent magnet constitutes one rotor magnetic pole section. The P permanent magnets 119 are magnetized so that each of the N poles is alternately arranged with each of the S poles on the side of the surface of the rotor core 117. As described above, the permanent magnet rotary motor in this embodiment has a structure with eight poles and 12 slots. With this arrangement, the least common multiple LCM (P, N) of the P(8) and the N(12) and the least common multiple LCM (P/2, N) of the ½ P(4) and the N(12) become 24 and 12, respectively, which are values different to each other. In this embodiment, the first and second angles Wa and Wb of the opening portions are set so that the angle difference Wa−Wb ranges from 4° to 6°.

Figure 7:
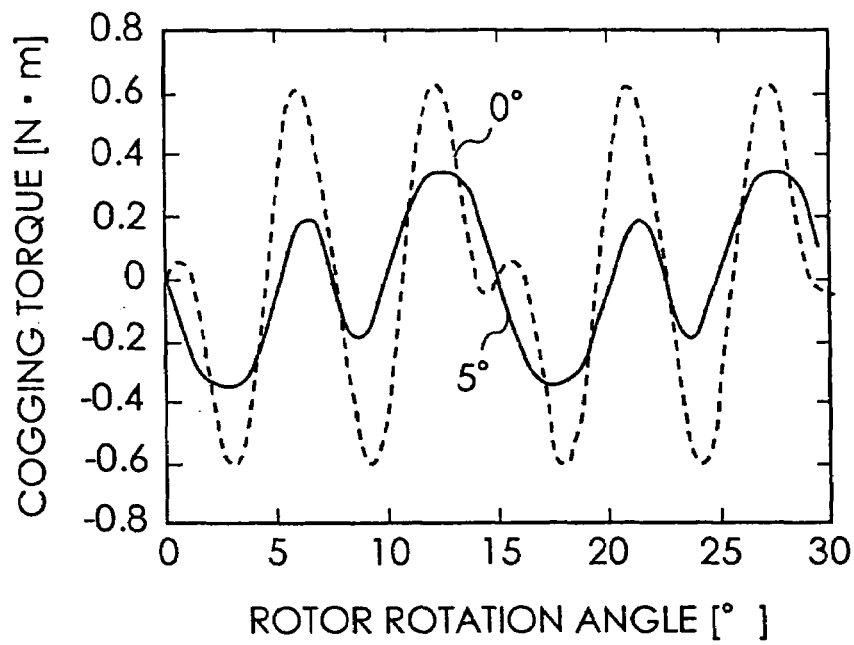
FIG. 7 is a graph showing results obtained by examining the relationship between a rotor rotation angle and the cogging torque when the value of the angle difference Wa−Wb is changed in the permanent magnet rotary motor shown in FIG. 6.

In the second embodiment, FIG. 7 is a graph indicating results obtained by examining the relationship between a rotor rotation angle and the cogging torque when the angle difference Wa−Wb is set to 0° and the relationship between the rotor rotation angle and the cogging torque when the angle difference Wa−Wb is set to 5°. It can be seen from FIG. 7 that when the angle difference Wa−Wb is set to 5°, the amount of the cogging torque produced at the time of a change of the rotor rotation angle can be reduced more than when the angle difference Wa−Wb is set to 0°.

Next, in a permanent magnet rotary motor in which the least common multiple LCM (P, N) of the P and the N becomes equal to the least common multiple LCM of the ½ P and the N, the relationship between the value of the angle difference Wa−Wb and the cogging torque was examined. More specifically, tests were carried out using the permanent magnet rotary motor having 10 poles and 12 slots. In the permanent magnet rotary motor having the 10 poles and the 12 slots, the least common multiple LCM (P, N) of the P(10) and the N(12) and the least common multiple LCM (P/2, N) of the ½P(5) and the N(12) become the equal value of 60. Further, in the permanent magnet rotary motor having the 10 poles and the 12 slots, the value of 360°/LCM(P, N)×⅔±1 ranges from 7° to 9°. Then, when the angle difference Wa−Wb is set to 0° and 8° in the permanent magnet rotary motor having the 10 poles and the 12 slots, the relationships between the cogging torque and the angle difference Wa−Wb were examined. A table 1 indicates the results obtained.

TABLE 1

| Wa − Wb (°) | COGGING TORQUE (N · m) |
|---|---|
| 0 | 0.05 |
| 8 | 0.40 |

It can be seen from the table 1 that when the angle difference Wa−Wb is set to 8°, the cogging torque is larger than when the angle difference Wa−Wb is set to 0°. As described above, it can be seen that in the permanent magnet rotary motor in which the least common multiple LCM (P, N) of the P and the N is equal to the least common multiple LCM (P/2, N) of the ½P and the N, the present invention cannot be applied.

Figure 8:
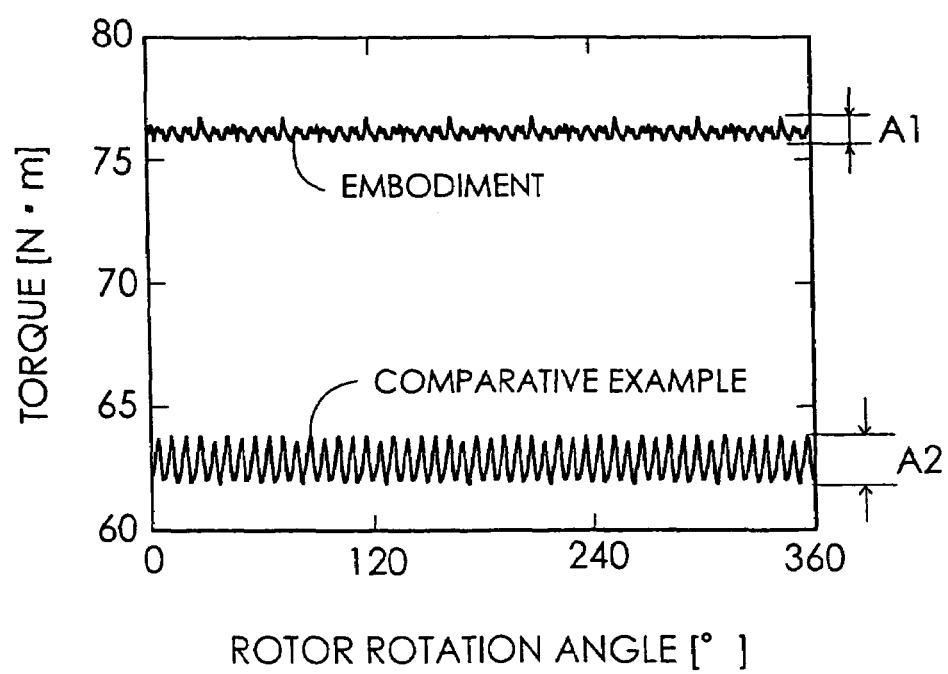
FIG. 8 is a graph showing the relationships among the rotor rotation angle, torque, and torque ripple in the permanent magnet rotary motor in this embodiment and a permanent magnet rotary motor of a comparative example.

Next, using the permanent magnet rotary motor in this embodiment and a permanent magnet rotary motor of a comparative example, the relationships among the rotor rotation angle, torque, and torque ripple were examined. The permanent magnet rotary motor of the comparative example has the same structure as the permanent magnet rotary motor in this embodiment except that the phases of the current flowing through adjacent two winding sections arranged in the peripheral direction of the rotor are shifted as indicated by the sequence of +U, +U, +V, +V, +W, +W, and the like so that currents have a phase difference of an electrical angle of 120° from one another. FIG. 8 shows the results of measurement. It can be seen in FIG. 8 that in the permanent magnet rotary motor in this embodiment, the torque can be increased more than in the permanent magnet rotary motor of the comparative example. Further, a characteristic-line amplitude A1 of the permanent magnet rotary motor in this embodiment and a characteristic-line amplitude A2 of the permanent magnet rotary motor of the comparative example are proportional to the torque ripples in this embodiment and the comparative example, respectively. Accordingly, it can be seen from FIG. 8 that in the permanent magnet rotary motor in the second embodiment, the torque ripple can be reduced more than in the permanent magnet rotary motor of the comparative example.

While the preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A permanent magnet rotary motor comprising:
a rotor having a rotor core and P rotor magnetic pole sections (P: an even natural number of 4 or more) formed of permanent magnets mounted to said rotor core, said P rotor magnetic pole sections being arranged at equal angle intervals of 360°/P in a peripheral direction of said rotor core; and
a stator comprising a stator core including N magnetic pole sections (N: a multiple of 6) and N slots, and N winding sections with exciting windings thereof concentratedly wound on said N stator magnetic pole sections, said N stator magnetic pole sections facing said rotor core and including magnetic pole surfaces having equal lengths in the peripheral direction, each of said N slots including an opening portion that opens toward said rotor core, each of said N stator magnetic pole sections and each of said N slots being alternately arranged at equal angle intervals of 360°/2N in the peripheral direction;
said P and said N being so set that a least common multiple LCM (P, N) of the P and the N is different from a least common multiple LCM (P/2, N) of ½ of the P and the N; and
currents flowing through three of said winding sections adjacent to one another in the peripheral direction having a phase difference of an electrical angle of 120° from one another; wherein
said N slots are grouped into first and second slot groups, wherein N/2 slots of N slots constituting the first slot group and the other N/2 of N slots constituting the second slot group, the opening portion of each of said N/2 slots in said first slot group having an open angle in the peripheral direction as a first angle and the opening portion of each of said N/2 slots in said second slot group having an open angle smaller than the first angle as a second angle;

said stator core comprises a plurality of divided cores, said plurality of divided cores being grouped into N/2 divided cores belonging to a first divided core group and N/2 divided cores belonging to a second divided core group;

each of said N/2 divided cores belonging to said first divided core group and each of said N/2 divided cores belonging to said second divided core group are alternately arranged in the peripheral direction; and cross-sectional shapes of the divided cores belonging to said first divided core group and said second divided core group arranged on each of the both sides of each of said N slots taken in a direction perpendicular to an axis line passing through a center of said rotor are shaped to be axisymmetrical with respect to a virtual line, the virtual line passing through the center of the opening portion of said each of said N slots and said axis line of said rotor, thereby alternately being arranged each of said N/2 slots of said first slot group and each of said N/2 slots of said second slot group in the peripheral direction.

2. The permanent magnet rotary motor according to claim 1, wherein an angle difference between the first angle and the second angle is set to be in the range of [360°/LCM(P, N)]×(⅔)−1° to [360°/LCM(P, N)]×(⅔)+1°.

3. The permanent magnet rotary motor according to claim 2, wherein each of said plurality of divided cores comprises an arcuate yoke constituent section, a winding-wound section, and a magnetic surface constituent section, the winding-wound section extending toward said rotor from substantially a middle of the yoke constituent section and with each of said exciting windings wound thereon, the magnetic surface constituent section being integrally formed at a leading end of the winding-wound section;

the magnetic surface constituent section includes one projecting portion projecting along the yoke constituent section;

an end of the magnetic surface constituent section of each of said N/2 divided cores in said first divided core group without the projecting portion faces an end of the magnetic surface constituent section of each of said N/2 divided cores in said second divided core group without the projecting portion, and the opening portion of each of said N/2 slots of said first slot group having the first angle is formed between the ends of the magnetic surface constituent sections of said each of said N/2 divided cores of said first core group and said each of said N/2 divided cores of second divided core group; and the projecting portion of said each of said N/2 divided cores in said first divided core group faces the projecting portion of said each of said N/2 divided cores in said second divided core group, and the opening portion of each of said N/2 slots of said second slot group having the second angle is formed between the projecting portions of said each of said N/2 divided cores in said first divided core group and said each of said N/2 divided cores in said second divided core group.

4. The permanent magnet rotary motor according to claim 2, wherein each of said plurality of divided cores comprises an arcuate yoke constituent section, a winding-wound section, and a magnetic surface constituent section, the winding-wound section extending toward said rotor from substantially a middle of the yoke constituent section and with each of said exciting windings wound thereon, the magnetic surface constituent section being integrally formed at a leading end of the winding-wound section;

the magnetic surface constituent section includes a first projecting portion and a second projecting portion having different projecting dimensions, the first projecting portion and the second projecting portion extending along the yoke constituent section and projecting toward both peripheral directions of the rotor core, respectively;

the first projecting portion of each of said N/2 divided cores in said first divided core group faces the first projecting portion of each of said N/2 divided cores in said second divided core group, and the opening portion of each of said N/2 slots of said first slot group having the first angle is formed between the first projecting portions of said each of said N/2 divided cores of said first core group and said each of said N/2 divided cores in said second divided core group; and the second projecting portion of said each of said N/2 divided cores in said first divided core group faces the projecting portion of said each of said N/2 divided cores in said second divided core group, and the opening portion of each of said N/2 slots of said second slot group having the second angle is formed between the second projecting portions of said each of said N/2 divided cores in said first divided core group and said each of said N/2 divided cores in said second divided core group.

5. The permanent magnet rotary motor according to claim 1, wherein said P rotor magnetic pole sections are embedded inside said rotor core; and outer peripheral portions of said rotor core accommodating said rotor magnetic pole sections are curved in such a manner to expand in a radially outward direction of said rotor core.

6. The permanent magnetic rotary motor according to claim 5, wherein the P is set to 16, and the N is set to 12.

7. The permanent magnetic rotary motor according to claim 1, wherein said P rotor magnetic pole sections are mounted to an outer peripheral surface of said rotor core.

8. The permanent magnetic rotary motor according to claim 7, wherein the P is set to 8, and the N is set to 12.

* * * * *